Patented Sept. 30, 1930

1,777,183

UNITED STATES PATENT OFFICE

ALBRECHT SCHMIDT, OF FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

LIQUID FOR PRODUCING LOW TEMPERATURES FOR COOLING PURPOSES

No Drawing. Application filed June 6, 1929, Serial No. 369,014, and in Germany July 6, 1928.

The present invention relates to a liquid for producing low temperatures for cooling purposes.

It is already known that, in order to obtain low temperatures, there may be used mixtures of solid carbonic acid and more or less volatile and, therefore, easily combustible organic solvents, such as ether, toluene, etc. It is also known that in organic volatile solvents, such as liquid sulfurous acid, can be used for this purpose. In the course of the said cooling processes the solvent volatilizes together with the carbonic acid, so that in order to obtain a cooling liquid in a mobile state, as it is sometimes required, for instance for feeding jacket cooling vessels, there must be used a special bath liquid, such as for instance a solution of calcium chloride which is itself to be cooled by means of the mixture of carbonic acid and solvent.

I have now found that a low-cooled bath liquid can directly be obtained by introducing solid carbonic acid into chlorosulfonic acid. It could not be anticipated a priori that chlorosulfonic acid would at all be suitable as a solvent, because solid carbonic acid always condenses some water on its surface; it, therefore, was to be expected that said water would produce a detrimental effect when brought in contact with the chlorosulfonic acid. This is not the case. The temperatures goes down almost immediately after addition of the solid carbonic acid below 0° and rapidly further down to —70° C. and even below this degree while at the same time the evolution of carbonic acid proceeds very quietly and constantly. When using appropriate insulated vessels and conduits the low cooled bath liquid thus obtained can be conveyed to any desired place where it is to be used. Iron vessels and conduits may be used for said purpose.

The advantages of the new cooling process reside especially in the fact that the solvent does not evaporate but remains in such a state that it can be further used for the same or any other purpose, and that it is not combustible.

By this process it is possible to produce quickly, reliably, cheaply and in a technically satisfactory manner temperatures below the freezing point of mercury at those places where no low cooling apparatus is available, in the laboratory as well as in the work shops.

Favorable mixing proportions are for instance for temperatures down to —45° C., 100 parts of chlorosulfonic acid, 25 parts of solid carbonic acid; for temperatures down to —65° C.; 100 parts of chlorosulfonic acid, 50 parts of solid carbonic acid; for temperatures down to —70° C.; 100 parts of chlorosulfonic acid, 100 parts of solid carbonic acid.

If the reactions take place in chlorosulfonic acid, the solid carbonic acid can directly be introduced into the reaction vessel.

I claim:

1. A liquid for producing low temperatures for cooling purposes, consisting of a mixture of chlorosulfonic acid and solid carbonic acid.

2. A liquid for producing low temperatures for cooling purposes, consisting of a mixture of 100 parts of chlorosulfonic acid and 25–100 parts of carbonic acid.

3. A liquid for producing low temperatures for cooling purposes, consisting of a mixture of 100 parts of chlorosulfonic acid and 100 parts of carbonic acid.

In testimony whereof, I affix my signature.

ALBRECHT SCHMIDT.